(12) United States Patent
Baek et al.

(10) Patent No.: US 7,839,841 B2
(45) Date of Patent: Nov. 23, 2010

(54) APPARATUS AND METHOD FOR PROVIDING VOIP SERVICE BASED ON IP MULTIMEDIA SUBSYSTEM

(75) Inventors: Hye-Won Baek, Seongnam-si (KR); Jae-Woo Kwon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 570 days.

(21) Appl. No.: 11/486,926

(22) Filed: Jul. 14, 2006

(65) Prior Publication Data

US 2007/0025279 A1    Feb. 1, 2007

(30) Foreign Application Priority Data

Jul. 14, 2005   (KR) .................. 10-2005-0063605

(51) Int. Cl.
*H04L 12/66* (2006.01)
(52) U.S. Cl. .................. 370/352; 455/445; 455/41.2
(58) Field of Classification Search .................. 370/352; 455/445, 436, 453, 450, 458, 41.2
See application file for complete search history.

(56) References Cited

U.S. PATENT DOCUMENTS

| | | | |
|---|---|---|---|
| 6,141,560 A | 10/2000 | Gillig et al. | |
| 2002/0071396 A1* | 6/2002 | Lee et al. | 370/252 |
| 2004/0213181 A1* | 10/2004 | Grech et al. | 370/331 |
| 2004/0266426 A1* | 12/2004 | Marsh et al. | 455/426.2 |
| 2005/0068938 A1* | 3/2005 | Wang et al. | 370/352 |
| 2005/0101245 A1* | 5/2005 | Ahmavaara | 455/1 |
| 2005/0282575 A1* | 12/2005 | Dorenbosch | 455/550.1 |
| 2006/0019667 A1* | 1/2006 | Hicks | 455/445 |
| 2006/0111112 A1* | 5/2006 | Maveddat | 455/439 |
| 2006/0142020 A1* | 6/2006 | Mueckenheim et al. | 455/453 |
| 2006/0155814 A1* | 7/2006 | Bennett et al. | 709/207 |
| 2006/0182061 A1* | 8/2006 | Naghian | 370/331 |
| 2006/0286984 A1* | 12/2006 | Bonner | 455/445 |

FOREIGN PATENT DOCUMENTS

| | | |
|---|---|---|
| DE | 20 2004 000 026 | 6/2004 |
| EP | 1 257 132 | 11/2002 |
| JP | 2003-502907 | 1/2003 |
| JP | 2003-339083 | 11/2003 |
| JP | 2005-064646 | 3/2005 |
| JP | 2005-080287 | 3/2005 |

(Continued)

OTHER PUBLICATIONS

ETSI Standards, User Group; User Interoperability Criteria, Feb. 2004.

(Continued)

*Primary Examiner*—Fan Tsang
*Assistant Examiner*—Simon King
(74) *Attorney, Agent, or Firm*—The Farrell Law Firm, LLP (57) ABSTRACT

Provided are an apparatus and method for providing VoIP service based on an IP multimedia subsystem (IMS). When a MS is located indoors, it accesses the IMS through a VoIP gateway. When the MS is located outdoors, it accesses the IMS through an IEEE 802.16 system. Therefore, the VoIP service can be provided over one telephone number allocated to the MS.

2 Claims, 14 Drawing Sheets

FOREIGN PATENT DOCUMENTS

| | | |
|---|---|---|
| JP | 2006-005772 | 1/2006 |
| JP | 2006-166018 | 6/2006 |
| JP | 2008-526097 | 7/2008 |
| KR | 1020050038262 | 4/2005 |
| WO | WO 00/77992 | 12/2000 |
| WO | WO 03/005741 | 1/2003 |
| WO | WO 2004/082219 | 9/2004 |
| WO | WO 2006/068558 | 6/2006 |

OTHER PUBLICATIONS

ETSI Standards, Digital Cellular Telecommunications System (Phase 2+); Universal Mobile Telecommunications System (UMTS); IP Multimedia Subsystem (IMS); Stage 2, Dec. 2004.

Wikipedia: IP Multimedia Subsystem, Jan. 5, 2006.

Richard P. Ejzak et al., Flexent IMS—The Convergence of Circuit and Packet Core Networks, vol. 2, No. 7, 2002, pp. 105-124.

* cited by examiner

APPARATUS AND METHOD FOR PROVIDING VOIP SERVICE BASED ON IP MULTIMEDIA SUBSYSTEM

This application claims priority under 35 U.S.C. §119 to an application entitled "Apparatus and Method for Voice over IP under IP Multimedia Subsystem" filed in the Korean Intellectual Property Office on Jul. 14, 2005 and allocated Serial No. 2005-63605, the contents of which are incorporated herein by reference.

BACKGROUND OF THE INVENTION

1. Field of the Invention

The present invention relates generally to an apparatus and method for providing Voice over Internet Protocol (VoIP) service based on an IP multimedia subsystem (IMS), and in particular, to an apparatus and method for providing VoIP service based on an IP multimedia subsystem in an integrated environment of an Institute of Electrical and Electronics Engineers (IEEE) 802.16 system and a cordless phone or Digital European Cordless Telecommunications (DECT). The Institute of Electrical and Electronics Engineers (IEEE) 802.16 system is a broadband wireless communication system.

2. Description of the Related Art

An existing converged voice service (called one phone service) between heterogeneous networks is provided using a cordless phone/cellular structure and a Bluetooth/cellular structure.

These structures provide a terminal with a Public Switched Telephone Network (PSTN) based voice service in a range where the cordless phone is usable, and a Mobile Switching Center (MSC) based voice service in the cellular network. The existing converged voice service between the heterogeneous networks is a circuit switched based service and provides call originating/terminating services over two telephone numbers, which are allocated to the PSTN and the cellular network, respectively. Because the service is provided over the different networks, there are many problems in terms of charging and service delivery between the different service providers.

SUMMARY OF THE INVENTION

An object of the present invention is to substantially solve at least the above problems and/or disadvantages and to provide at least the advantages described herein. Accordingly, an object of the present invention is to provide an apparatus and method for providing VoIP service based on an IP multimedia subsystem over a single telephone number.

Another object of the present invention is to provide an apparatus and method for providing VoIP service based on an IP multimedia subsystem in an integrated environment of a broadband wireless access system and a cordless phone.

According to one aspect of the present invention, there is provided a MS configured to receive a Voice over Internet Protocol (VoIP) service based on an IP Multimedia Subsystem (IMS) by interfacing with a VoIP gateway when the MS is located indoors and by interfacing with an Institute of Electrical and Electronics Engineers (IEEE) 802.16 system when the MS is located outdoors. The MS includes a cordless phone signal processor for exchanging a cordless phone signal with the VoIP gateway when the MS is located indoors; a Session Initiation Protocol (SIP) message processor for processing an SIP message exchanged with the IMS through the IEEE 802.16 system; and an IEEE 802.16 system processor for communicating with the IEEE 802.16 system when the MS is located outdoors.

According to another aspect of the present invention, there is provided a VoIP gateway for accessing the IMS through the interface with the cordless phone signal of the MS when the MS is located indoors.

According to still another aspect of the present invention, there is provided a communicating method of a MS configured to receive a VoIP service based on an IMS by interfacing with a VoIP gateway when the MS is located indoors and by interfacing with an IEEE 802.16 system when the MS is located outdoors. The communicating method includes receiving the VoIP service based on the IMS through the VoIP gateway and a cordless telephone signal, when the MS is located indoors, and receiving the VoIP service based on the IMS through the IEEE 802.16 system, when the MS is located outdoors.

According to yet further another aspect of the present invention, there is provided a communicating method of a MS configured to receive a VoIP service based on an IMS by interfacing with a VoIP gateway when the MS is located indoors and by interfacing with an IEEE 802.16 system when the MS is located outdoors. The communicating method includes checking whether a cordless phone signal is received from the VoIP gateway; communicating with the VoIP gateway over the cordless phone signal and receiving the VoIP service based on the IMS, upon reception of the cordless phone signal; and communicating with the IEEE 802.16 system and receiving the VoIP service based on the IMS, upon non-reception of the cordless phone signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

A description of an IP multimedia subsystem (IMS) is provided herein for explaining an apparatus and method according to the present invention. The IMS is a network architecture for providing Session Initiation Protocol (SIP) based multimedia service that is specified in $3^{rd}$ Generation Partnership Project (3GPP) Release 5.

Figure 1:
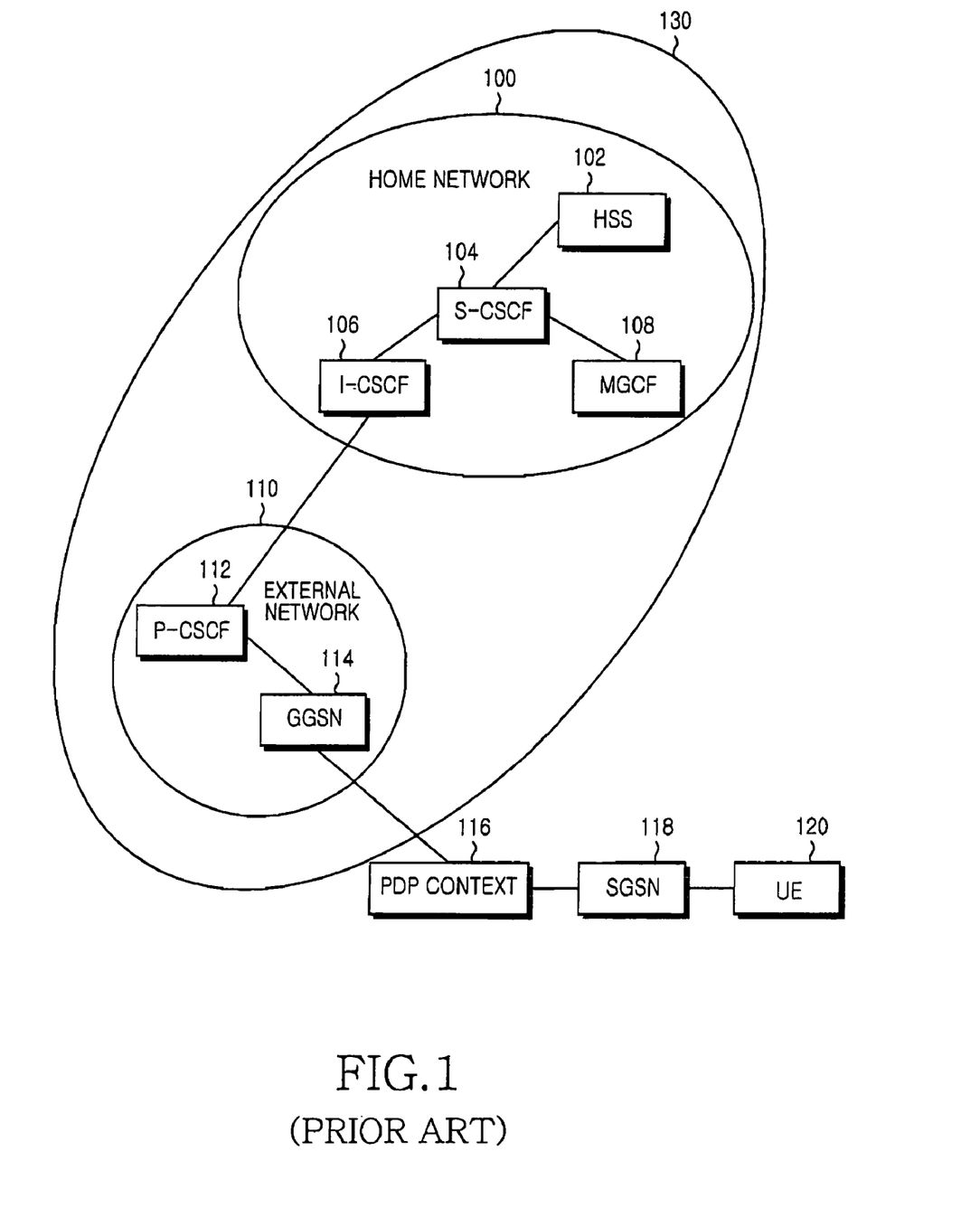
FIG. 1 is a block diagram schematically illustrating network entities of a general IP multimedia subsystem.

FIG. 1 is a block diagram of schematically illustrating network entities of a general IMS. Referring to FIG. 1, a Call Stateful Control Function (CSCF) is introduced to for supporting a call stateful. Unlike a general wired SIP server, the CSCF manages a call stateful function, a quality of service (QoS), a charging function, and a security function.

In order to allow a Packet Switched (PS) connection and communication in the IMS, a user equipment (UE) 120 activates a Packet Data Protocol (PDP) context 116 by using a Serving GPRS Support Node (SGSN) 114 and a Gateway GPRS Support Node (GGSN) 114 and is assigned an IP address from the GGSN 114. The SGSN 118 transmits packets transmitted or received by the UE 120.

The GGSN 114 transforms outgoing or incoming packets into an appropriate PDP format and assigns the PDP address (IP address). The UE 120 can provide the packet communication only after it is assigned the IP address from the GGSN 114.

In order to start the session or receive a session request, the UE 120 has to be registered in a home network 100 included in a core network 130 of the IMS. Assuming that the UE 120 is roaming to an external network 110, when the UE 120 requests a registration through a current Proxy-CSCF (P-CSCF) 112, the P-CSCF 112 finds an Interrogating-CSCF (I-CSCF) 106 and transmits an SIP resister message to the Serving-CSCF (S-CSCF) 104 of the home network 100. The S-CSCF 104 acquires information of the UE 120 from a Home Subscriber Server (HSS) 102. The HSS 102 is a network entity that provides its own information and information of the UE 120. A Media Gateway Control Function (MGCF) is a network entity that is required for interface with PSTN. Assuming that the UE 120 is located within the home network 100, it transmits the SIP register message to the S-CSCF 104 of the home network 100.

The IEEE 802.16 system will be described herein for explaining the apparatus and method of the present invention.

Figure 2:
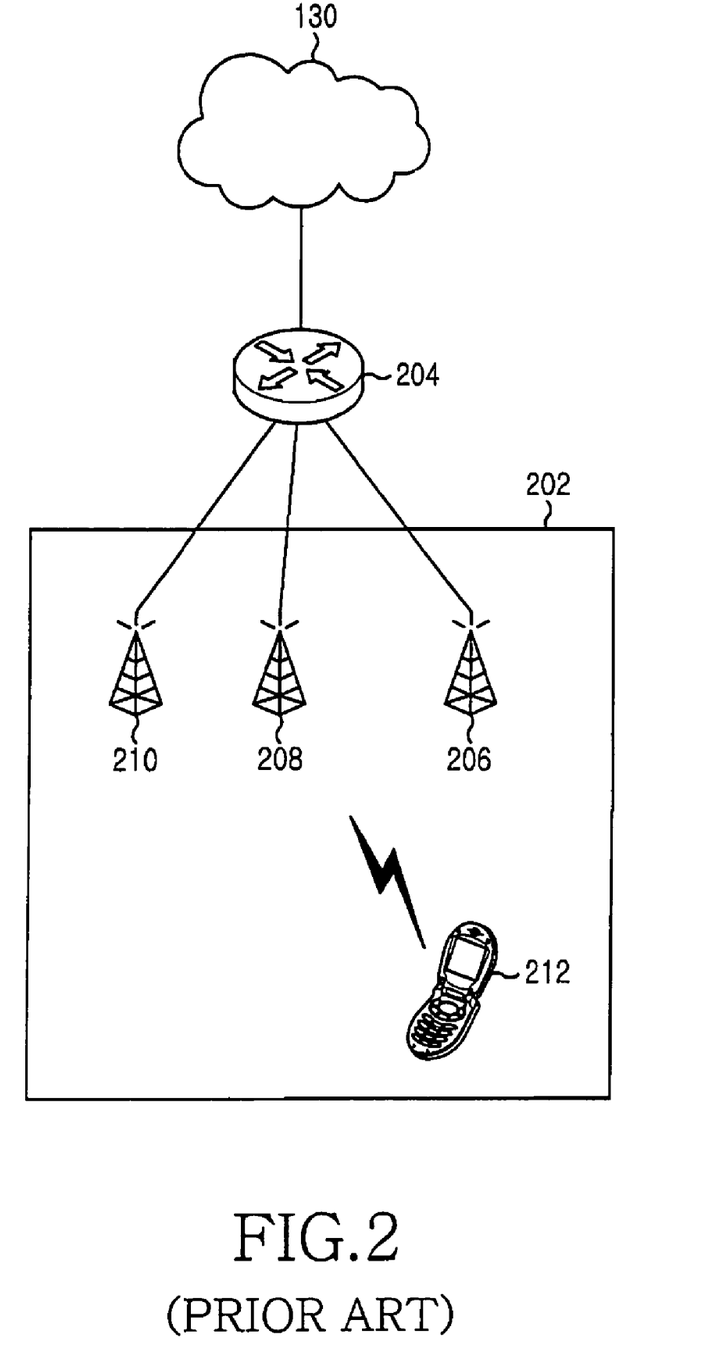
FIG. 2 is a schematic diagram illustrating a general IEEE 802.16.

FIG. 2 is a schematic diagram of a general IEEE 802.16 system. The IEEE 802.16 system is a broadband wireless access system. Referring to FIG. 2, the IEEE 802.16 system includes an access network 202 and a MS (MS) 212.

The access network 202 provides a wireless access based on IEEE 802.16. The access network 202 includes a plurality of Radio Access Stations (RASs) 206 to 210 and an Access Control Router (ACR) 204. The ACR matches the RASs 206 to 210 over an IP network and operates as a router to transmit/receive data between an external network and the MS 212.

Figure 3:
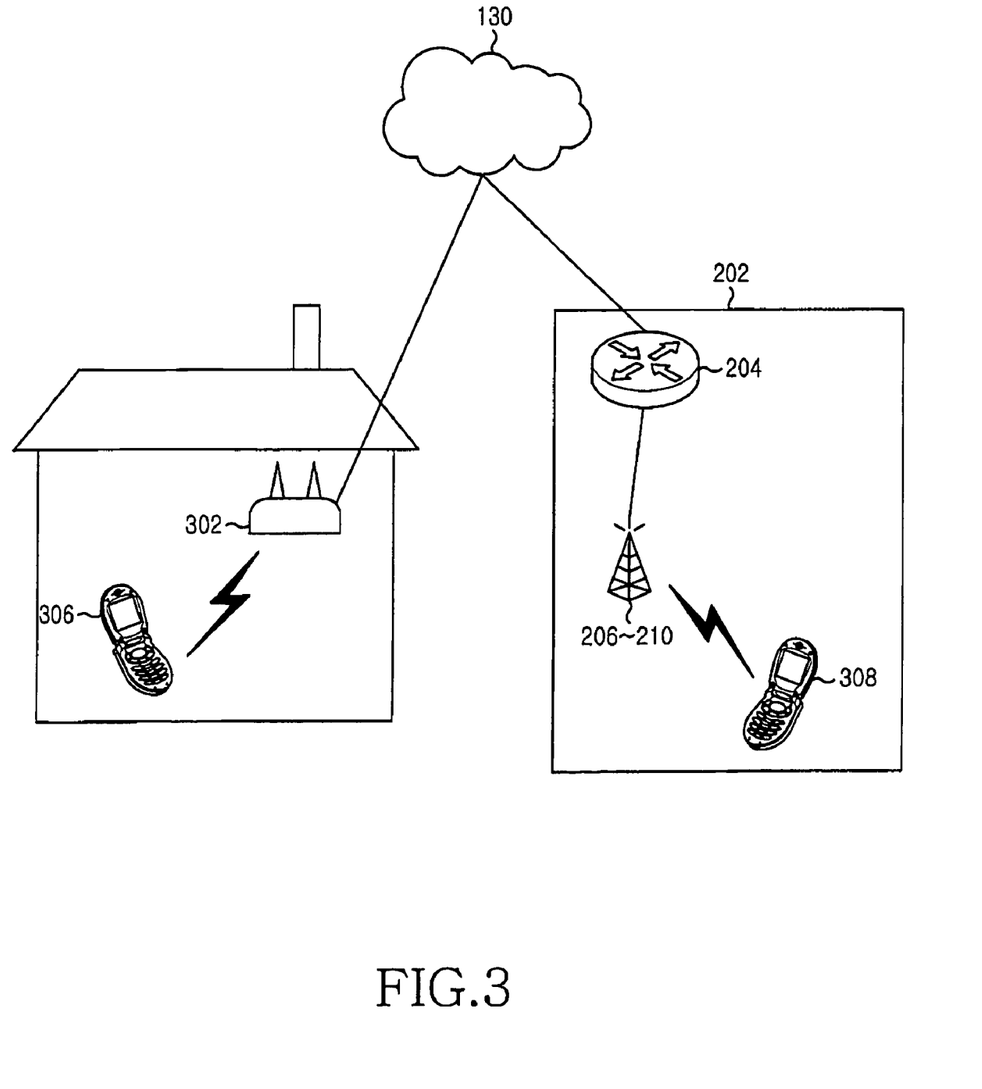
FIG. 3 is a schematic diagram illustrating a VoIP network based on an IP multimedia subsystem according to the present invention.

FIG. 3 is a schematic diagram illustrating a VoIP network for providing VoIP service based on the IMS according to the present invention. Referring to FIG. 3, the VoIP network supports a cordless phone technology and an IEEE 802.16 system technology. The VoIP network includes a VoIP gateway 302, an access network 202, and an IMS core network 130. When an MS 306 having an SIP function is used as a cordless phone, the VoIP gateway 302 accesses the IMS to provide a VoIP service. The access network 202 allows an MS 308 having an SIP function to access the IEEE 802.16 system. When the MS 306 is located indoors, the VoIP gateway 302 is a network entity directly accessing the IMS and also operates as an SIP client of the IMS. The VoIP gateway 302 performs the same function as the UE 120 of FIG. 1. Here, the IEEE 802.16 system is a broadband wireless communication system.

Figure 4:
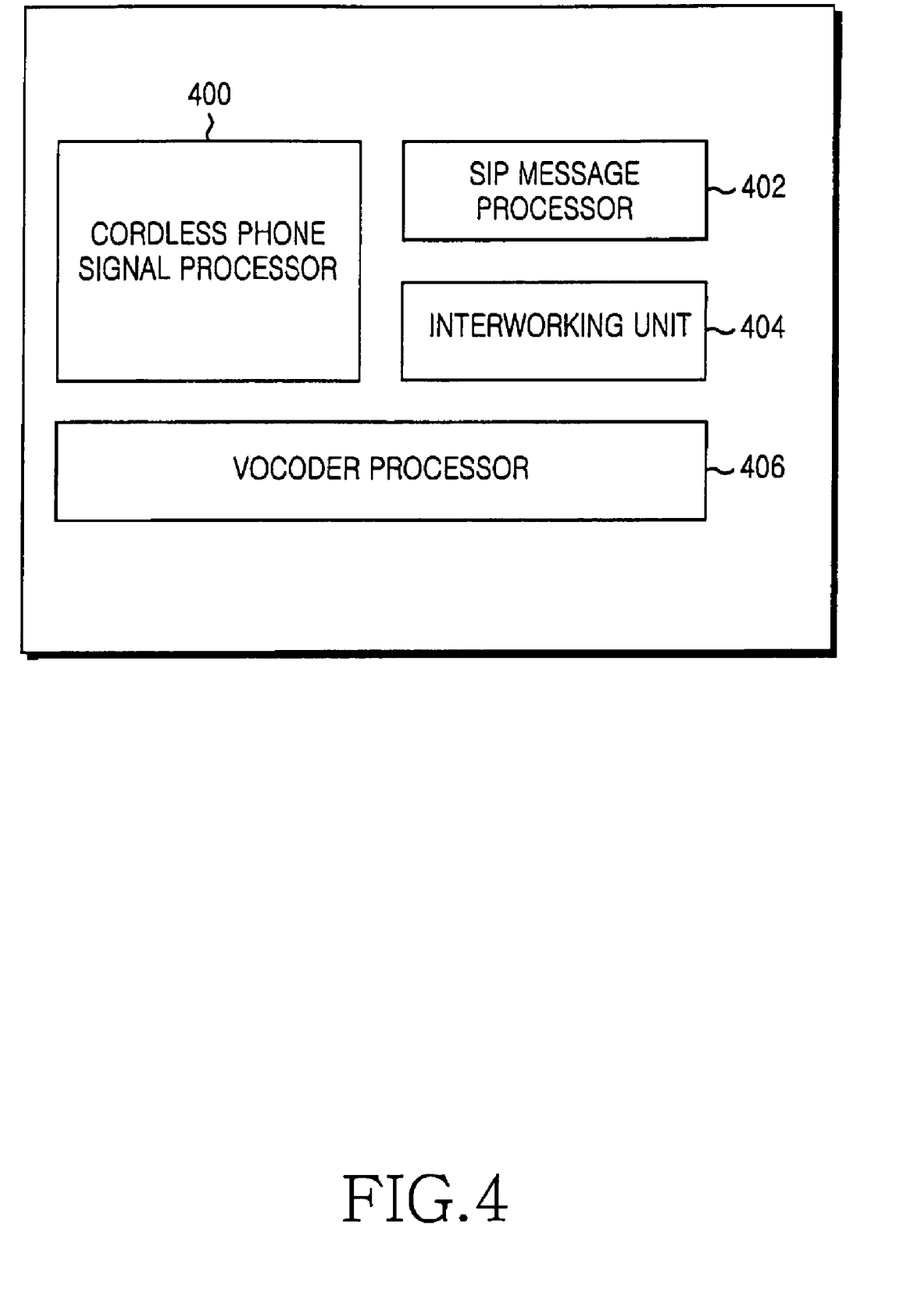
FIG. 4 is a block diagram illustrating a VoIP gateway according to the present invention.

FIG. 4 is a block diagram illustrating the VoIP gateway according to the present invention. Referring to FIG. 4, a cordless phone signal processor 400 processes a cordless phone signal that is used when the VoIP gateway communicates with the MS.

An interworking unit 404 converts a Dual Tone Multi Frequency (DTMF) signal and a voice signal transmitted from the MS into a corresponding SIP message, and converts a received SIP message into a corresponding cordless phone signal. An SIP message processor 402 operates as an IMS SIP client.

A vocoder processor 406 performs a codec conversion.

When receiving the cordless phone signal from the MS, the cordless phone signal processor 400 drives the interworking unit 404 and registers the MS in the S-CSCF 104 of the IMS through the SIP message processor 402.

Figure 5:
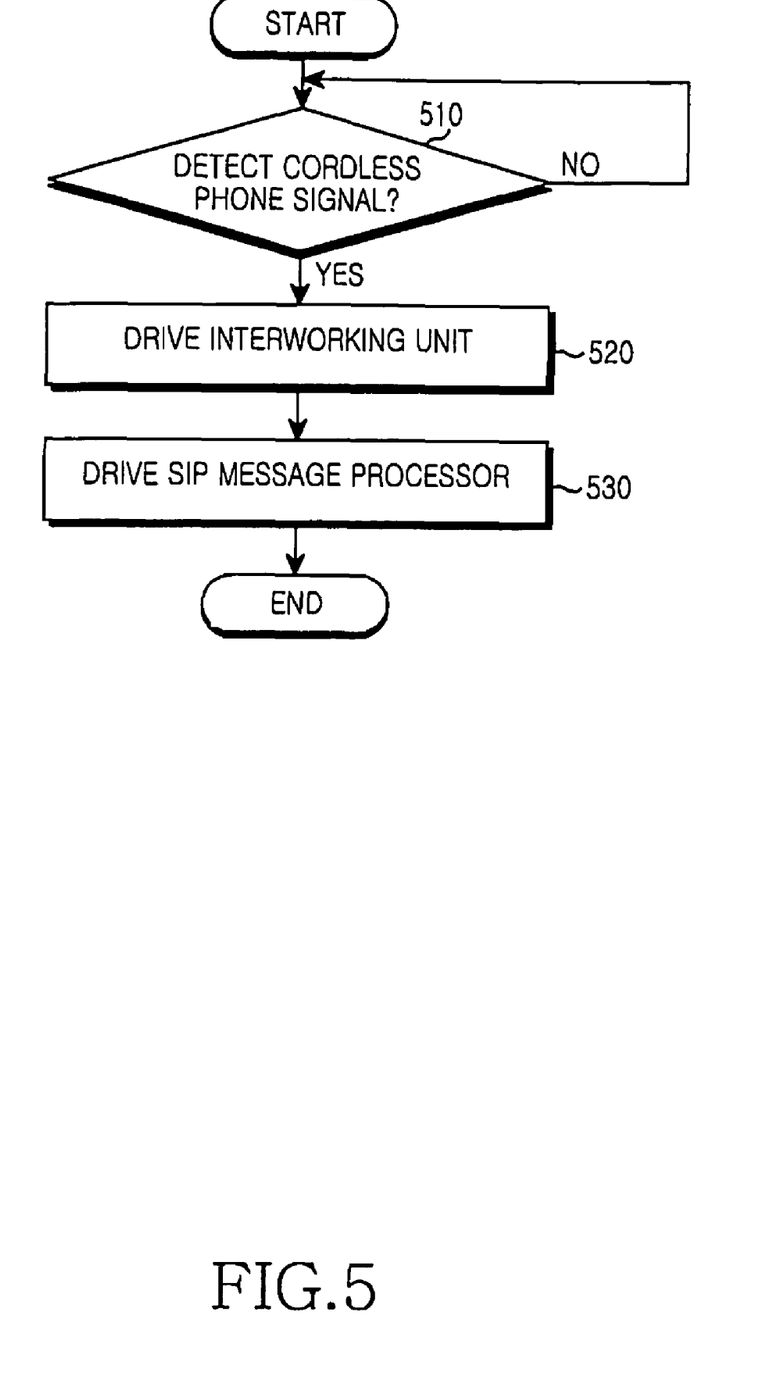
FIG. 5 is a flowchart illustrating an operation of the VoIP gateway according to the present invention.

FIG. 5 is a flowchart illustrating an operation of the VoIP gateway according to the present invention. Referring to FIG. 5, the VoIP gateway detects a cordless phone signal transmitted from the MS in step 510. In steps 520 and 530, the interworking unit 404 and the SIP message processor 402 are driven to register the MS in the S-CSCF 104, so that the MS is ready for communication.

Figure 6:
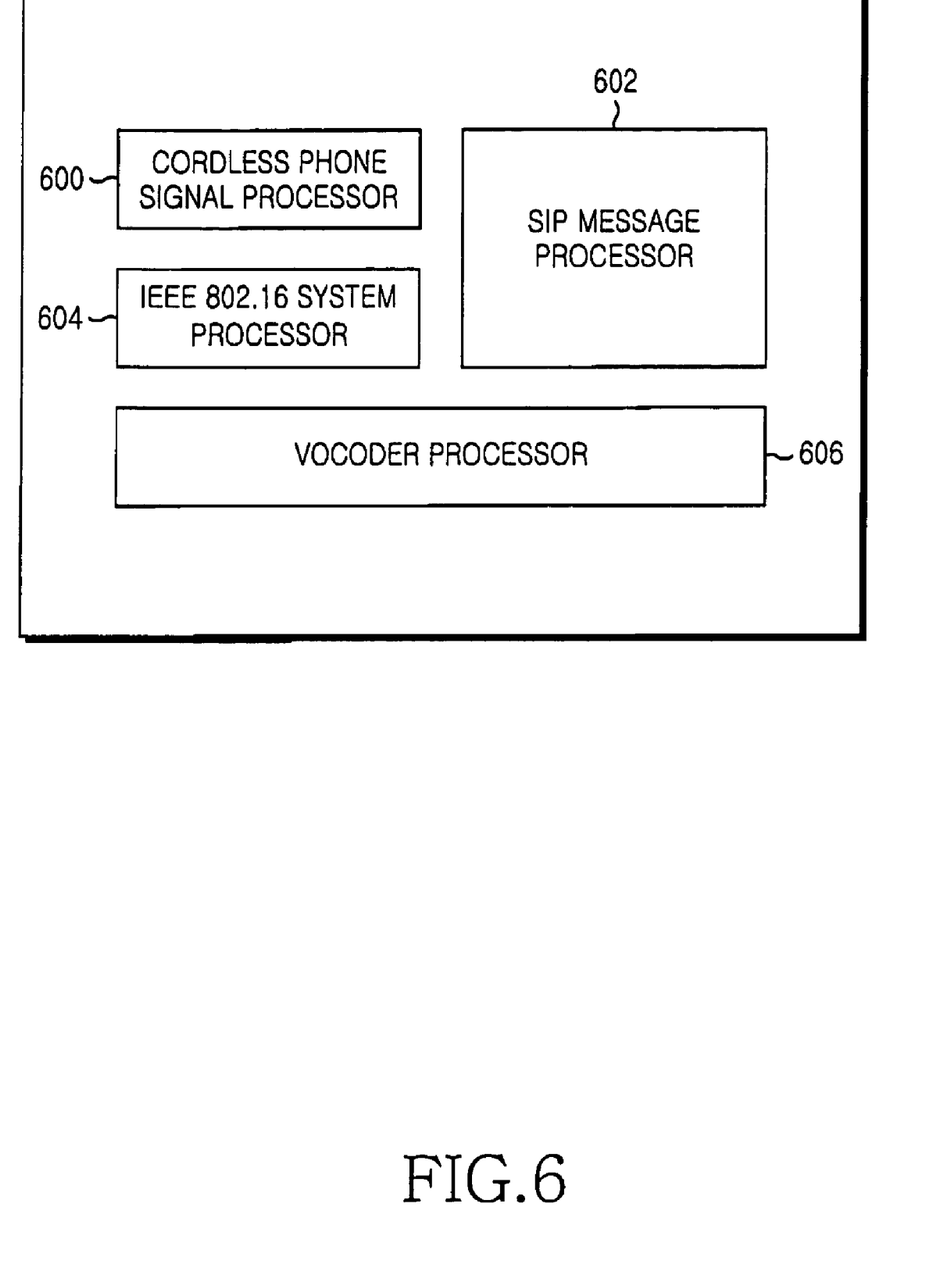
FIG. 6 is a block diagram illustrating an MS according to the present invention.

FIG. 6 is a block diagram illustrating the MS according to the present invention. Referring to FIG. 6, a cordless phone signal processor 600 processes a cordless phone signal that is used when the MS communicates with the VoIP gateway.

When the MS communicates with the IEEE 802.16 system in an outdoor area, an SIP signal processor 602 operates as an SIP client of the IMS.

An IEEE 802.16 system processor 604 interfaces with an external IEEE 802.16 system.

A vocoder processor 606 performs a codec conversion. A position registration, a call origination, and a call termination are based on the specification of standard IMS. The IEEE 802.16 system processor 604 and the SIP message processor 602 do not operate when the MS transmits/receives the cordless phone signal either to or from the VoIP gateway. When the MS cannot communicate with the VoIP gateway over the cordless phone signal, the cordless phone signal processor 600 drives the IEEE 802.16 system processor 604. The IEEE 802.16 system processor 604 registers the MS in the S-CSCF server through the SIP message processor 602.

Figure 7:
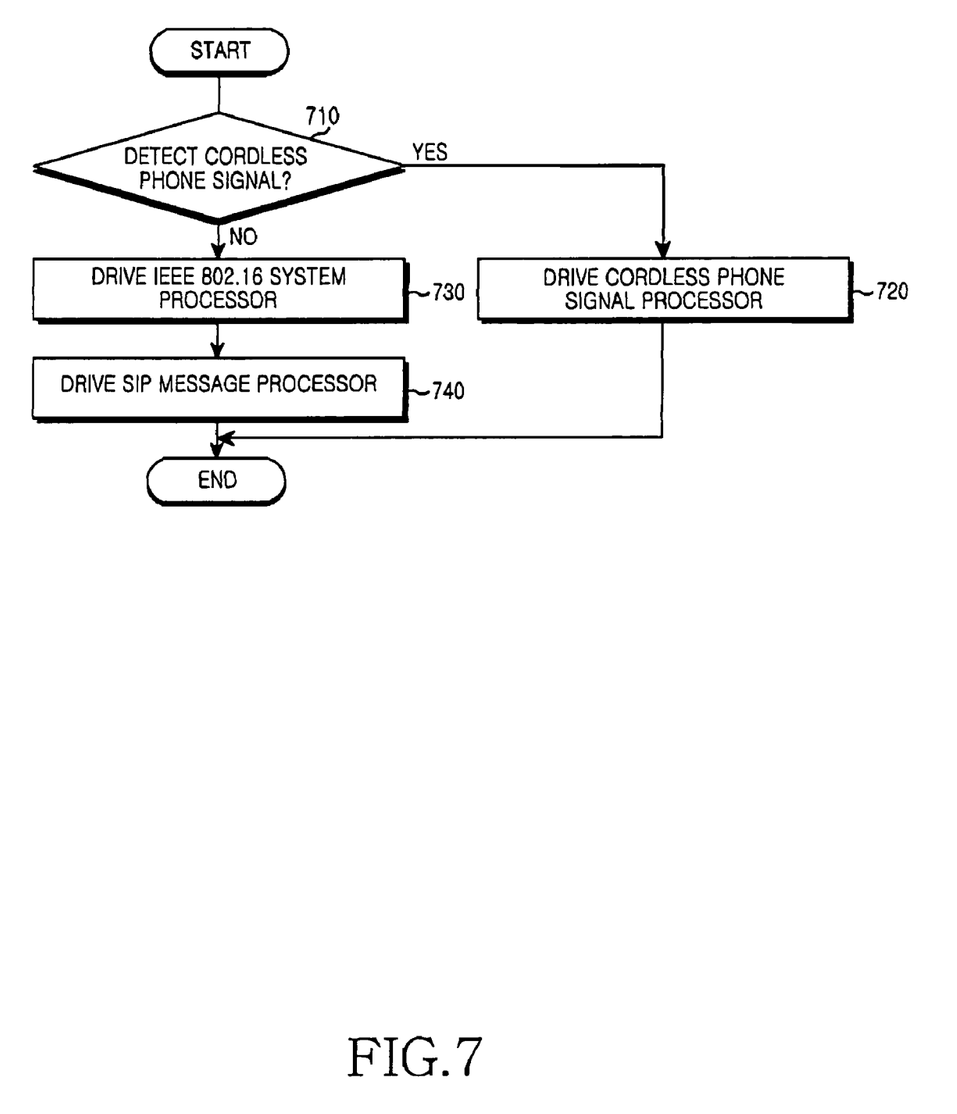
FIG. 7 is a flowchart illustrating an operation of the MS according to the present invention.

FIG. 7 is a flowchart illustrating an operation of the MS according to the present invention. Referring to FIG. 7, upon turning on the MS, the MS searches the cordless phone signal in step 701. In step 702, when the MS detects the cordless phone signal, the MS drives the cordless phone signal processor 600 to switch into a cordless phone mode. In step 730, when the MS does not detect the cordless phone signal in step 710, the MS is considered as being located outdoors, so that the IEEE 802.16 system processor is driven. In step 740, the SIP message processor is driven to register the MS in the S-CSCF 104.

Figure 8:
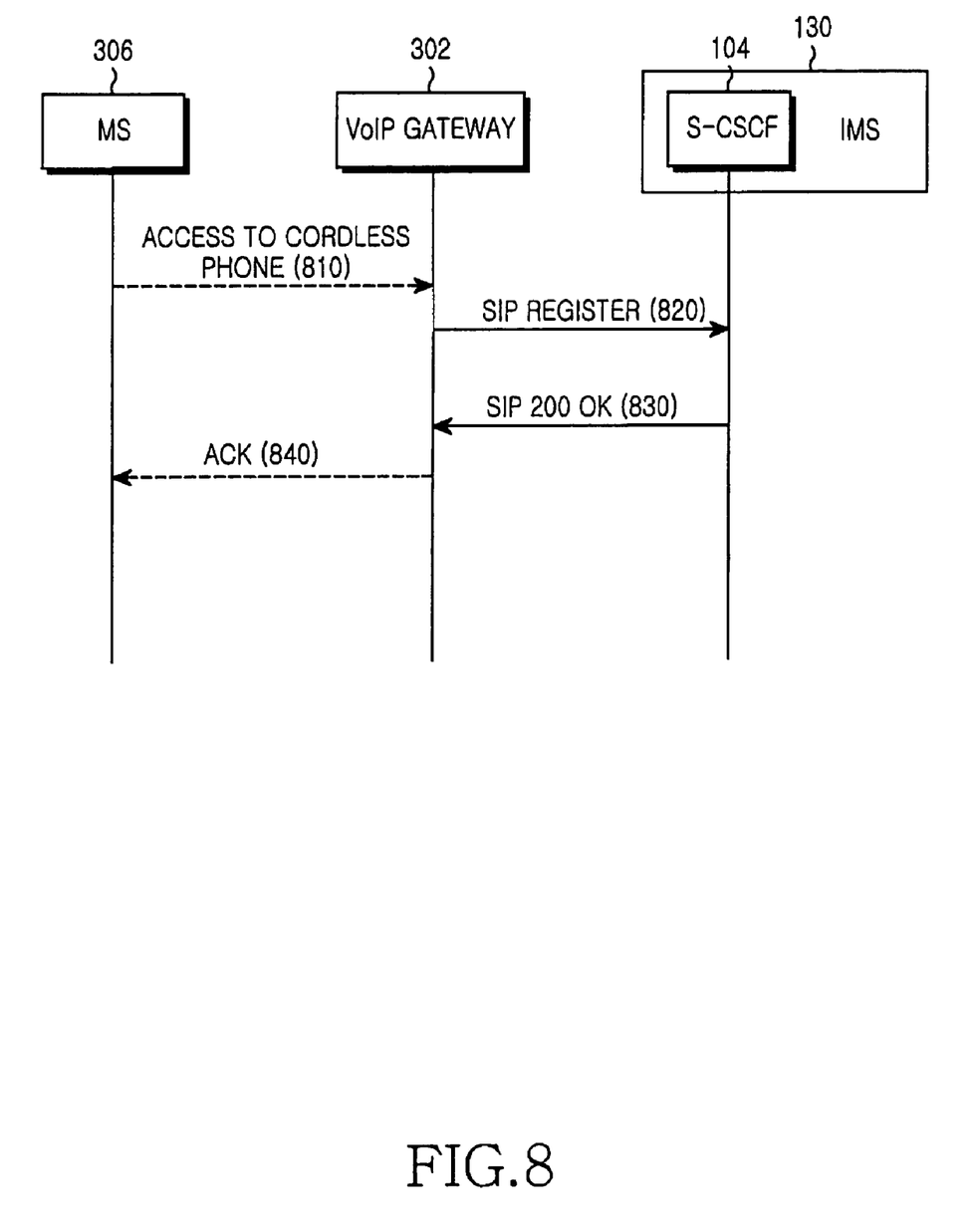
FIG. 8 is a ladder diagram illustrating a process of registering the MS when it is located indoors according to the present invention.

FIG. 8 is a ladder diagram illustrating a process of registering the MS located indoors according to the present invention. Referring to FIG. 8, in step 810, when the MS 306 is located indoors, the cordless phone signal processor 400 detects the cordless phone signal and drives the SIP client function. In step 820, the SIP message processor 402 of the VoIP gateway 302 transmits an SIP register message to the S-CSCF 104 of the IMS 302, so that a current position of the MS is registered. In step 830, the S-CSCF 104 inspects the received SIP register message and, if successful, the S-CSCF 104 transmits a success message (SIP 200 OK) to the VoIP gateway 302. In step 840, the VoIP gateway 302 transmits an acknowledgement (ACK) message to the MS 306.

Figure 9:
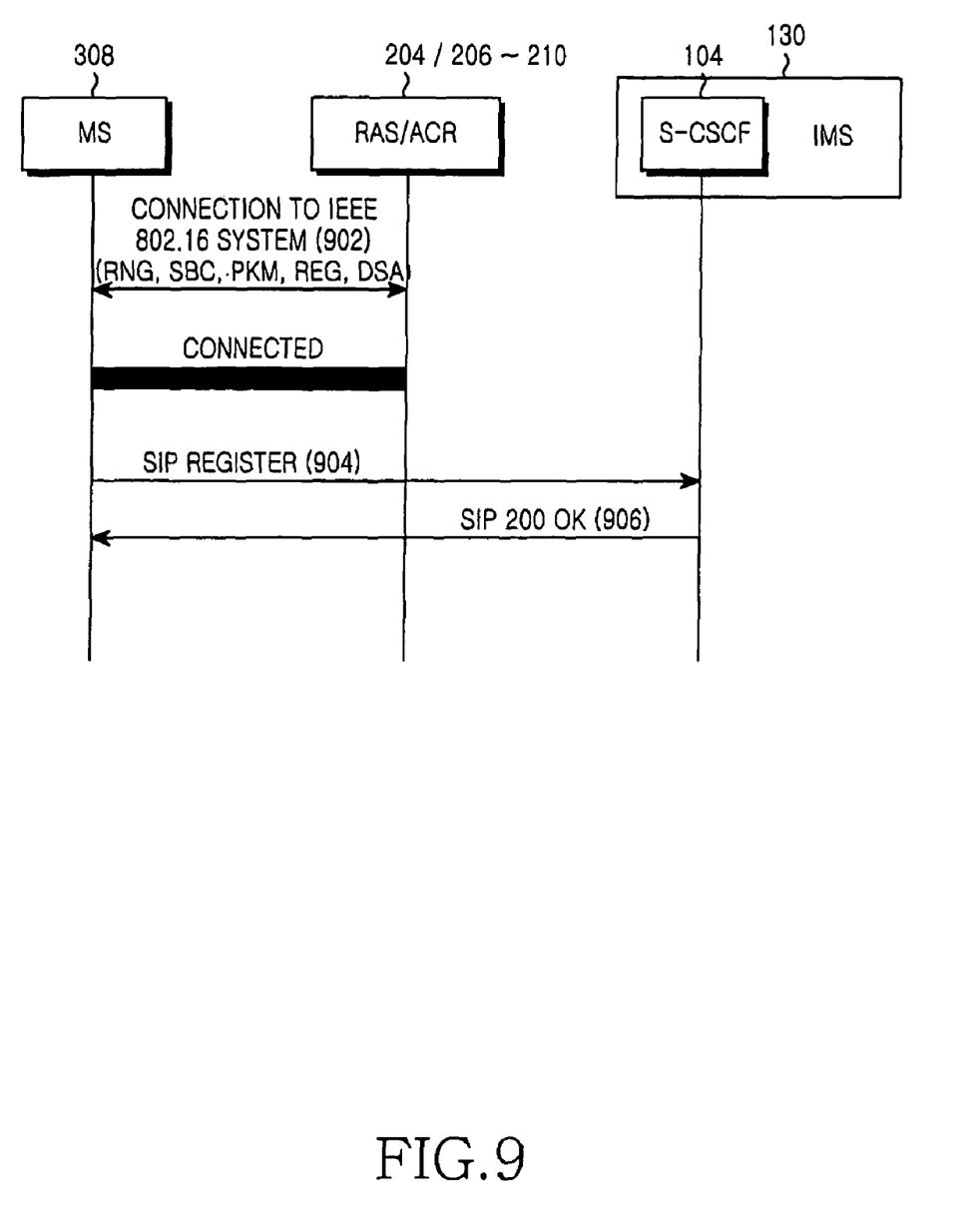
FIG. 9 is a ladder diagram illustrating a process of registering the MS through an IEEE 802.16 system when the MS is located outdoors according to the present invention.

FIG. 9 is a ladder diagram illustrating a process of registering the MS through the IEEE 802.16 system when the MS is located outdoors according to the present invention. Referring to FIG. 9, when the MS 308 relocates outdoors, the cordless phone signal processor 600 of the MS 308 does not operate because the MS 308 can no longer receive the cordless phone signal. In step 902, the MS 308 performs a connecting process of accessing the IEEE 802.16 system.

The connecting process of accessing the IEEE 802.16 system will be described below. A ranging (RNG) is performed upon the MS 308 entering a network. The RNG is a process of correcting an uplink data transmission timing and adjusting a frequency and power of the MS 308.

SS Basic Capabilities (SBC) exchange a physical parameter and authentication policy information with the RAS.

A Privacy Key Management (PKM) exchanges key information, which is required for MAC message authentication and traffic encryption, between the MS 308 and the base station (BS). Also, the PKM performs MS authentication and subscriber authentication.

A registration (REG) exchanges registration information with the ACR 204. The registration information includes capability information related to service flow (SF) and IP convergence sublayer (CS) of the MS 308, motion information, and automatic request (ARQ) parameter.

A Dynamic Service Addition (DSA) performs a connection ID (CID) for setting a new connection between the MS 308 and the RASs 206 to 210 and exchanges SF and IF CS of the corresponding connection.

In step 904, upon the MS 308 connecting to the ACR/RAS 204 and 206 to 210, the SIP message processor 602 of the MS 308 transmits the SIP register message to the S-CSCF 104 of the IMS and the MS 308 is registered.

In step 906, the S-CSCF 104 inspects the received SIP register message and, if successful, it transmits a success message (SIP 200 OK) to the MS 308.

Figure 10:
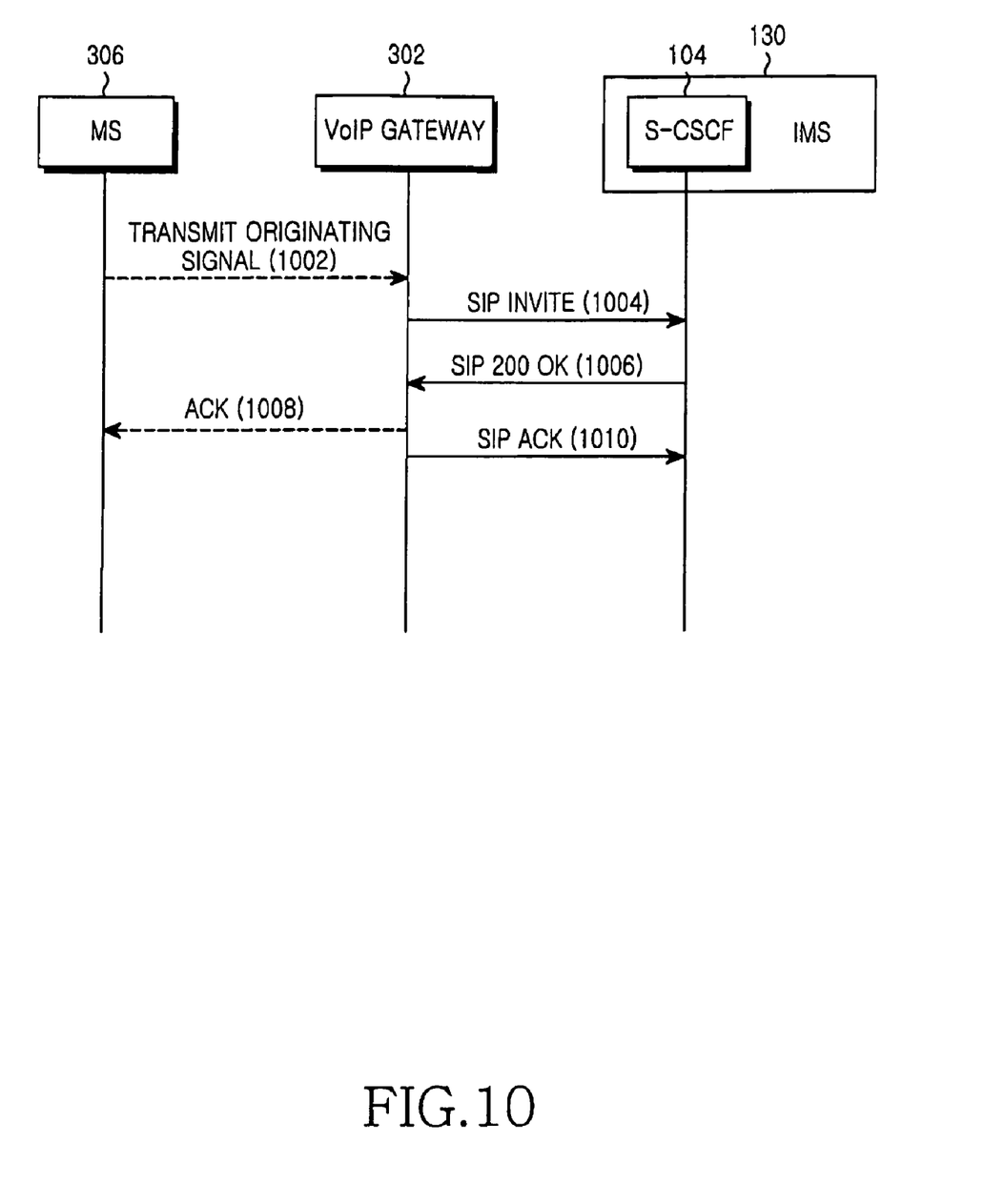
FIG. 10 is a ladder diagram illustrating a call originating process of the MS when it is located indoors according to the present invention.

FIG. 10 is a ladder diagram illustrating a call originating process of the MS that is located indoors. Referring to FIG. 10, in step 1002, when the indoors MS originates a call over the cordless phone signal, the VoIP gateway 302 detects the cordless phone signal to drive the SIP message processor 402. In step 1004, the SIP message processor 402 of the VoIP gateway 302 transmits an SIP INVITE message to the S-CSCF 104 of the IMS. The SIP INVITE message is an SIP message that is used to originate a call.

In step 1006, the S-CSCF 104 inspects the received SIP register message and, if successful, it transmits a success message (SIP 200 OK) to the VoIP gateway 302. In step 1008, the VoIP gateway 302 receiving the success message transmits an ACK message to the MS 306. In step 1010, the VoIP gateway 302 transmits an SIP ACK message to the S-CSCF 104.

Figure 11:
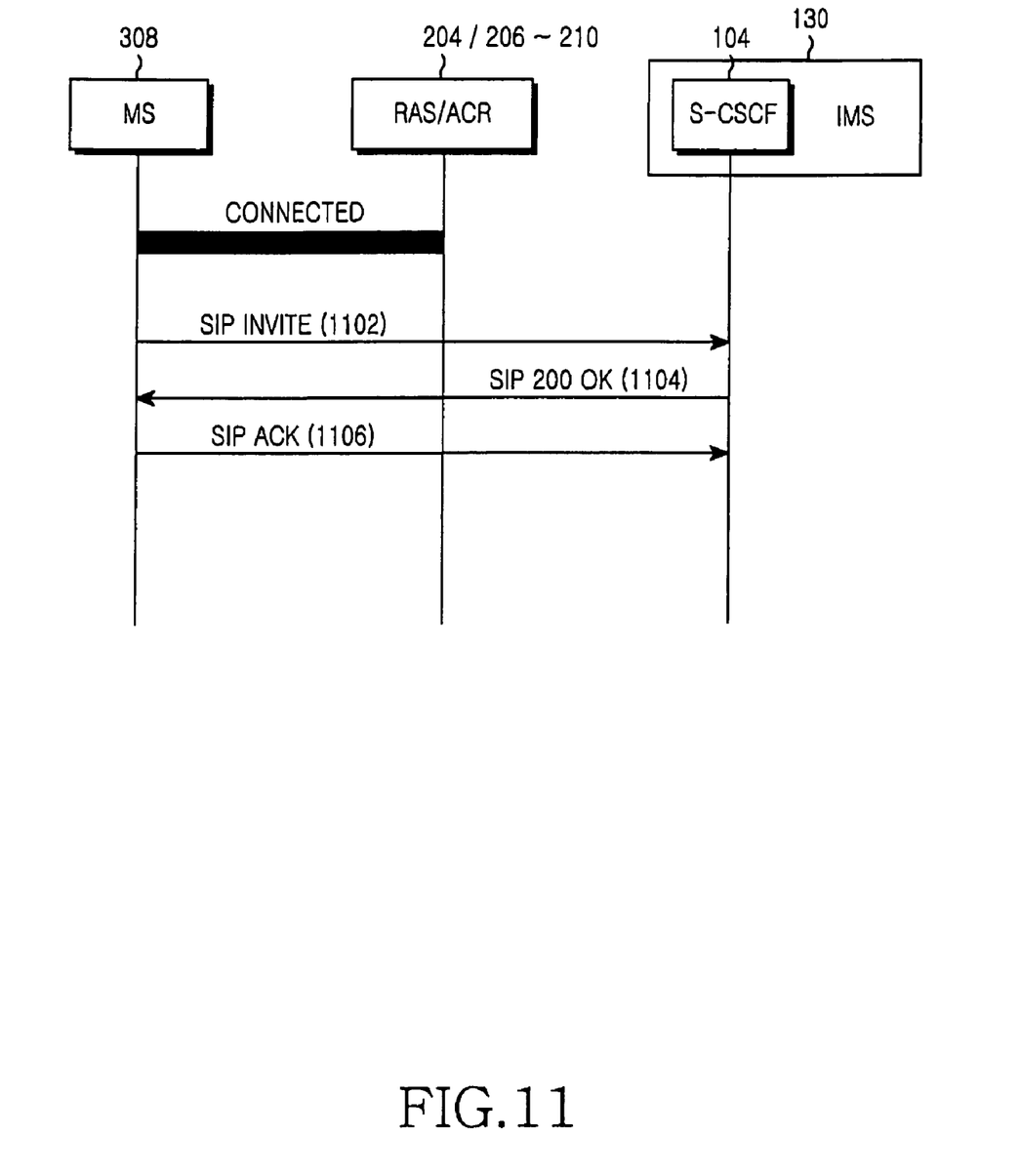
FIG. 11 is a flowchart illustrating a call originating process of the MS through the IEEE 802.16 system when the MS is located outdoors according to the present invention.

FIG. 11 is a ladder diagram illustrating a call originating process of the MS through the IEEE 802.16 system when the MS is located outdoors according to the present invention. Referring to FIG. 11, in step 1102, the SIP message processor 602 of the MS 308 transmits an SIP INVITE message to the S-CSCF 104 of the IMS.

In step 1104, the S-CSCF 104 inspects the SIP INVITE message and, if successful, it transmits a success message (SIP 200 OK) to the MS 308. In step 1108, the MS 308 transmits an SIP ACK message to the S-CSCF 104.

Figure 12:
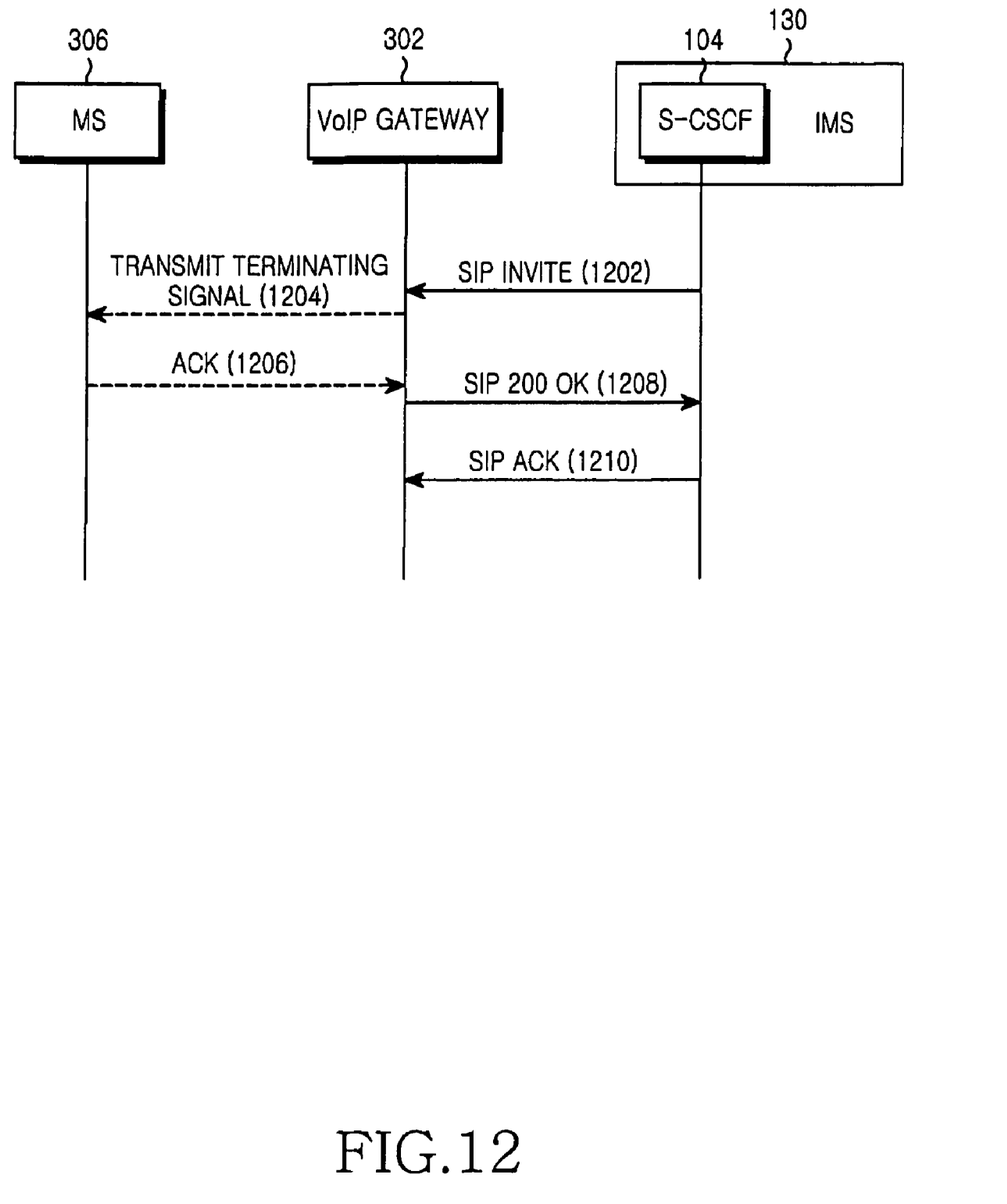
FIG. 12 is a ladder diagram illustrating a call terminating process of the MS when it is located indoors according to the present invention.

FIG. 12 is a ladder diagram illustrating a call terminating process of the MS when it is located indoors according to the present invention. Referring to FIG. 12, in step 1202, when the VoIP gateway 302 receives an SIP INVITE message, the interworking unit 404 converts the SIP into a cordless phone signal. In step 1204, the VoIP gateway 302 transmits a terminating call to the MS 306 through the cordless phone signal processor 400. In step 1206, the MS 306 receiving the terminating call transmits a corresponding ACK signal. In step 1208, the VoIP gateway 302 converts the ACK signal into an SIP success message (SIP 200 OK) and transmits the converted SIP success message to the S-CSCF 104. In step 1210, the S-CSCF 104 transmits an SIP ACK message to the VoIP gateway 302.

Figure 13:
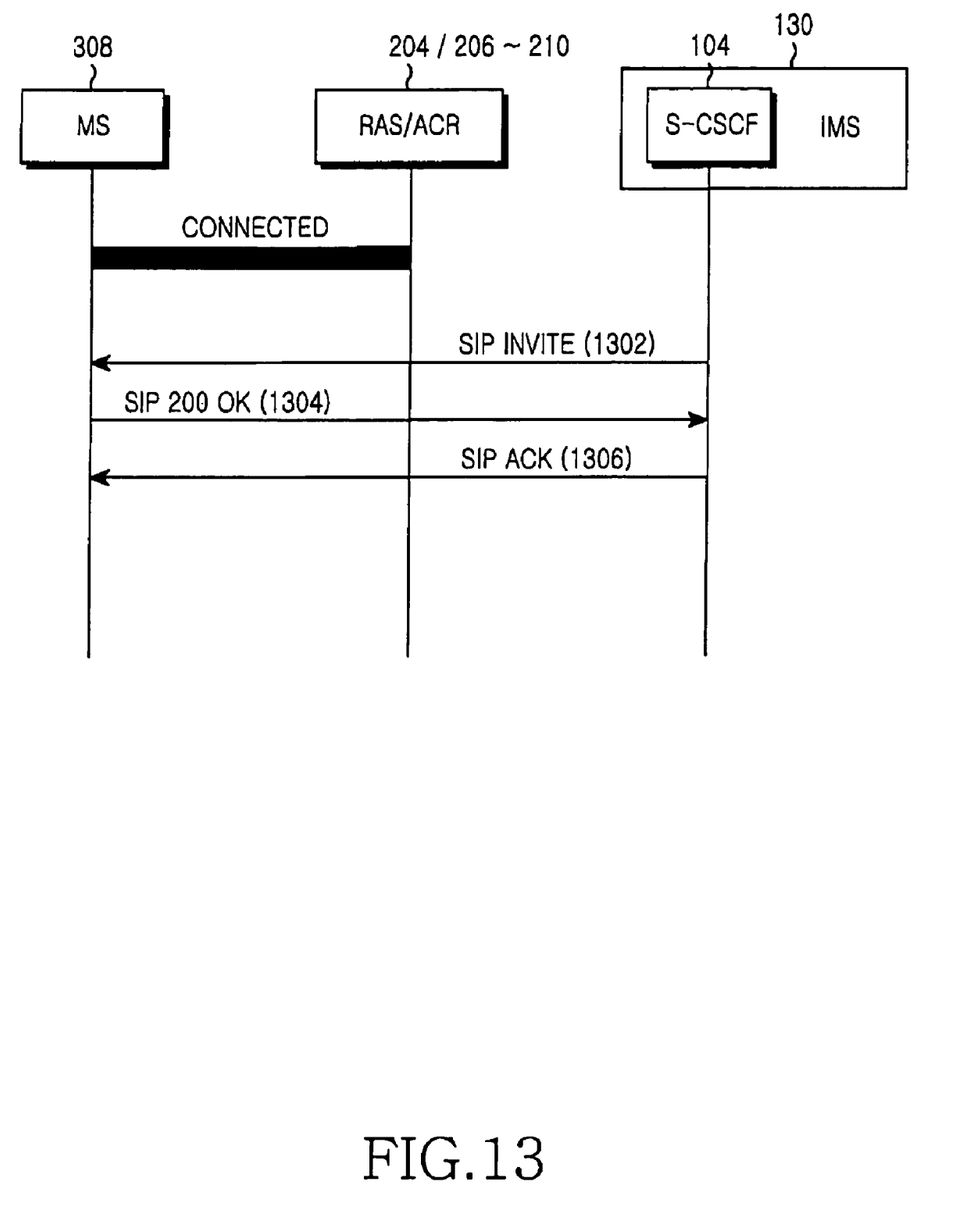
FIG. 13 is a ladder diagram illustrating a call terminating process of the MS through the IEEE 802.16 system when the MS is in a non-idle mode according to the present invention.

FIG. 13 is a ladder diagram illustrating a call terminating process of the MS through the IEEE 802.16 system when the MS is in a non-idle mode according to the present invention.

Referring to FIG. 13, in steps 1302 and 1304, the MS 308 receives an SIP INVITE message from the S-CSCF 104 of the IMS 130 and transmits an SIP success message (SIP 200 OK) to the S-CSCF 104. In step 1306, the S-CSCF 104 transmits an SIP ACK message to the MS 308.

Figure 14:
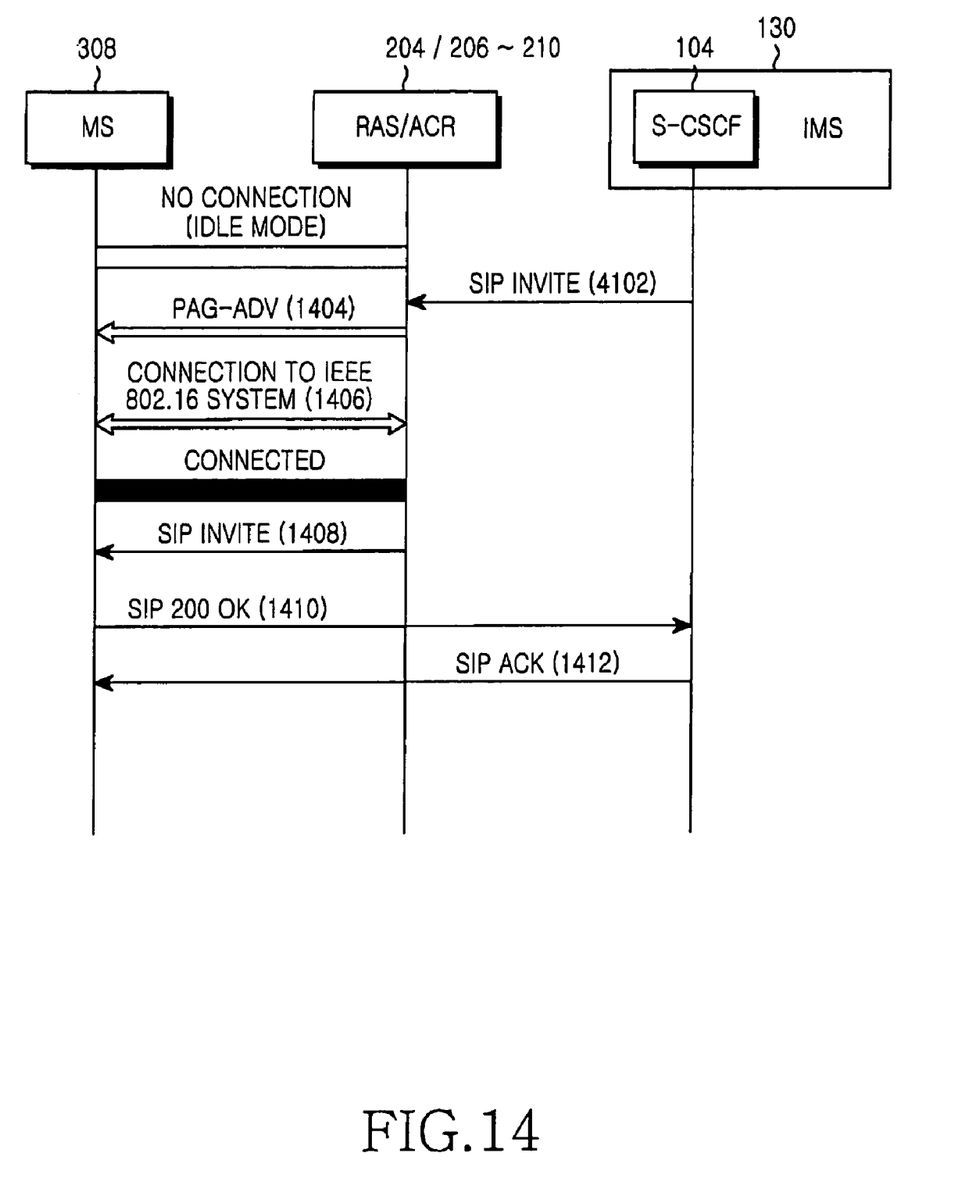
FIG. 14 is a ladder diagram illustrating a call terminating process of the MS through the IEEE 802.16 system when the MS is in the idle mode according to the present invention.

FIG. 14 is a ladder diagram illustrating a call terminating process of the MS through the IEEE 802.16 system when the MS is in the idle mode according to the present invention.

Referring to FIG. 14, in step 1402, the ACR/RAS 204 and 206 to 210 receives an SIP INVITE message of the MS 308 in an idle mode. In step 1404, the ACR/RAS 204 and 206 to 210 transmits a Paging Advertisement (PAG-ADV) message to the MS 308, so that the MS 308 is activated. In step 1406, the MS 308 is connected to the IEEE 802.16 system. In step 1408, the ACR/RAS 204 and 206 to 210 transmits the received SIP INVITE message to the MS 308. In step 1410, the MS 308 transmits an SIP success message (SIP 200 OK) to the S-CSCF 104. In step 1412, the S-CSCF 104 transmits an SIP ACK message to the MS 308.

According to the present invention, when the MS is located indoors, it accesses the IMS through the interface with the cordless phone signal of the VoIP gateway. On the other hand, when the MS is located outdoors, it accesses the IMS through the IEEE 802.16 system. Therefore, unlike the one phone service requiring two telephone numbers, the present invention can provide the VoIP service through one telephone number.

While the invention has been shown and described with reference to certain preferred embodiments thereof; it will be understood by those skilled in the art that various changes in form and details may be made therein without departing from the spirit and scope of the invention as defined by the appended claims.

What is claimed is:

1. A mobile station configured to receive a Voice over Internet Protocol (VoIP) service based on an IP Multimedia Subsystem (IMS) by interfacing with a VoIP gateway when the mobile station is located indoors and by interfacing with a broadband wireless access system when the mobile station is located outdoors, the mobile station comprising:
   a cordless phone signal processor for exchanging a cordless phone signal with the VoIP gateway when the mobile station is located indoors;
   a Session Initiation Protocol (SIP) message processor for processing an SIP message exchanged with the IMS through the broadband wireless communication system; and
   a broadband wireless access system processor for communicating with the broadband wireless access system when the mobile station is located outdoors;
   wherein the SIP message processor and the broadband wireless access system processor are not driven when the cordless phone signal processor receives the cordless phone signal from the VoIP gateway, and the SIP message processor and the broadband wireless access system processor are driven when the cordless phone signal processor does not receive the cordless phone signal from the VoIP gateway.

2. A communicating method of a mobile station configured to receive a VoIP service based on an IMS by interfacing with a VoIP gateway when the mobile station is located indoors and by interfacing with a broadband wireless access system when the mobile station is located outdoors, the communicating method comprising the steps of:
   checking whether a cordless phone signal is received from the VoIP gateway;
   upon reception of the cordless phone signal, communicating with the VoIP gateway over the cordless phone signal and receiving the VoIP service based on the IMS via a cordless phone signal processor; and
   when the cordless phone signal is not received, communicating with the broadband wireless access system via a Session Initiation Protocol (SIP) message processor and receiving the VoIP service based on the IMS via a broadband wireless access system processor;
   wherein the SIP message processor and the broadband wireless access system processor are not driven when the cordless phone signal processor receives the cordless phone signal from the VoIP gateway, and the SIP message processor and the broadband wireless access system processor are driven when the cordless phone signal processor does not receive the cordless phone signal from the VoIP gateway.

* * * * *